United States Patent [19]
Yamagiwa

[11] 3,853,191
[45] Dec. 10, 1974

[54] WEIGHING MACHINE

[75] Inventor: Masanori Yamagiwa, Ise, Japan

[73] Assignee: Ise Electronics Corporation, Ise City, Mie Prefecture, Japan

[22] Filed: Apr. 5, 1973

[21] Appl. No.: 348,153

[30] Foreign Application Priority Data
Mar. 31, 1972 Japan.............................. 47-32483
Mar. 31, 1972 Japan.............................. 47-37928

[52] U.S. Cl........ 177/210, 177/DIG. 3, 250/231 SE
[51] Int. Cl.......................... G01g 3/14, G01d 5/34
[58] Field of Search.......... 177/DIG. 3, DIG. 6, 210; 250/231 SE

[56] References Cited
UNITED STATES PATENTS
2,376,234  5/1945  De Castro................... 177/DIG. 3
3,123,164  3/1964  Echenique et al............ 177/DIG. 6

Primary Examiner—George H. Miller, Jr.
Attorney, Agent, or Firm—Dike, Bronstein, Roberts, Cushman & Pfund

[57] ABSTRACT

A weighing machine with a digital display including a converter which responds to the body weight and generates digital signals, and electrical circuits which respond to the digital signals and generate signals actuating a display tube only when receiving a specific digital signal from the converter whereby a high stability is attained in the indication of the display.

9 Claims, 7 Drawing Figures

WEIGHING MACHINE

BRIEF DESCRIPTION OF THE INVENTION

This invention relates to a weighing machine, and particularly to an improved construction which is immune to unstableness in the indication of the display.

Weighing machines are well known in which the amount of body weight is displayed with figure representations thereof. In such a weighing machine, the descending distance of a platform bearing the body weight causes a code disc to rotate, and the digital code recorded on the disc is detected to display it with figure representations. The code disc tends to make partial rotary movement back and forth when a person mounts the platform. This unstable rotary movement results in unstable indication of the digital display. Further, the electrical circuits for display are supplied with electrical power at all times.

Accordingly, in the weighing machines of the prior art unnecessary power consumption occurs and further electrical components used therein have shortened life. These problems are serious particularly when integrated circuits are employed in the electronic circuits.

Therefore, it is an object of the present invention to provide an improved weighing machine having a stable visual indicator.

Another object of this invention is to provide an improved weighing machine capable of minimizing power consumption and of increasing the life span of the electrical components used in the circuits.

The novel features which are considered as characteristic for this invention are set forth in particular in the appended claims. This invention itself, however, both as to its construction and its method of operation, together with additional objects and advantages thereof, will be best understood from the following description of embodiments when read in connection with the accompanying drawings.

DESCRIPTION OF THE PREFERRED EMBODIMENT

Figure 1:
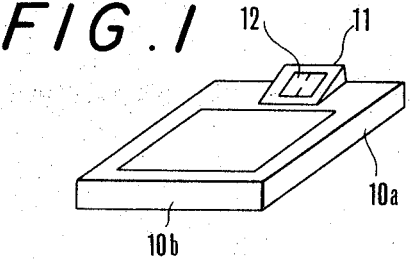
FIG. 1 is a perspective view showing an external appearance of the weighing machine.

Referring now to the drawings, wherein like reference characters designate like or corresponding parts throughout the several drawings, FIG. 1 illustrates a perspective view showing an external appearance of the weighing machine. The main body 10b of the weighing machine has a platform 10a and an indicator 12 in which display tubes are provided, and which is capable of displaying two order figures such as 0 to 99. When one mounts the platform 10a, the platform goes down by the amount of his weight which in turn rotates the code disc 20 in FIG. 2.

Figure 2:
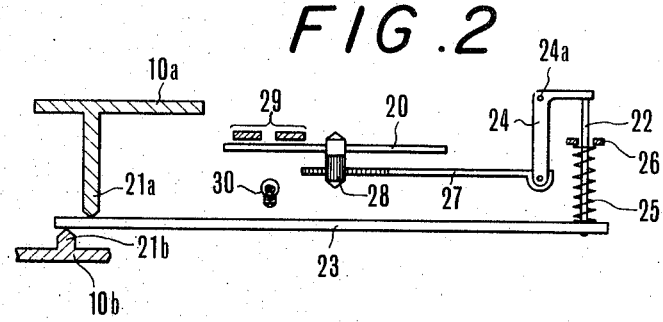
FIG. 2 is a cross sectional view showing the mechanical construction in which the descending motion of the platform causes the code disc to rotate.

FIG. 2 shows a mechanical structure by which the descending motion of the platform 10a causes the disc 20 to rotate. A lever 23 at one end is supported on knife edge 21b with projecting portion 21a of the platform 10a bearing thereon and at the other end is movably fitted to the follower pin 22. The pivot points of the projecting portions 21a and 21b are selected such that when the force transmitted by descending motion of the platform 10a is applied on the lever 23, the lever may be rotated clockwise with respect to the supporting point of the projection 21b. A crank lever 24 rotates about a crank axis 24a in response to motion of the follower pin 22. A spring 25 is positioned between a spring supporter 26 and the end portion of the lever 23. The spring 25 serves to control the deflection of lever 23 and thus the amount of rotation of the code disc 20. The rotational movement of the crank lever 24 is converted into linear movement of a rack 27 which rotates the code disc 20 by way of a pinion 28. A plurality of photocells 29 are located over the code disc 20 while a light source 30 is located under the code disc 20.

Figure 3A:
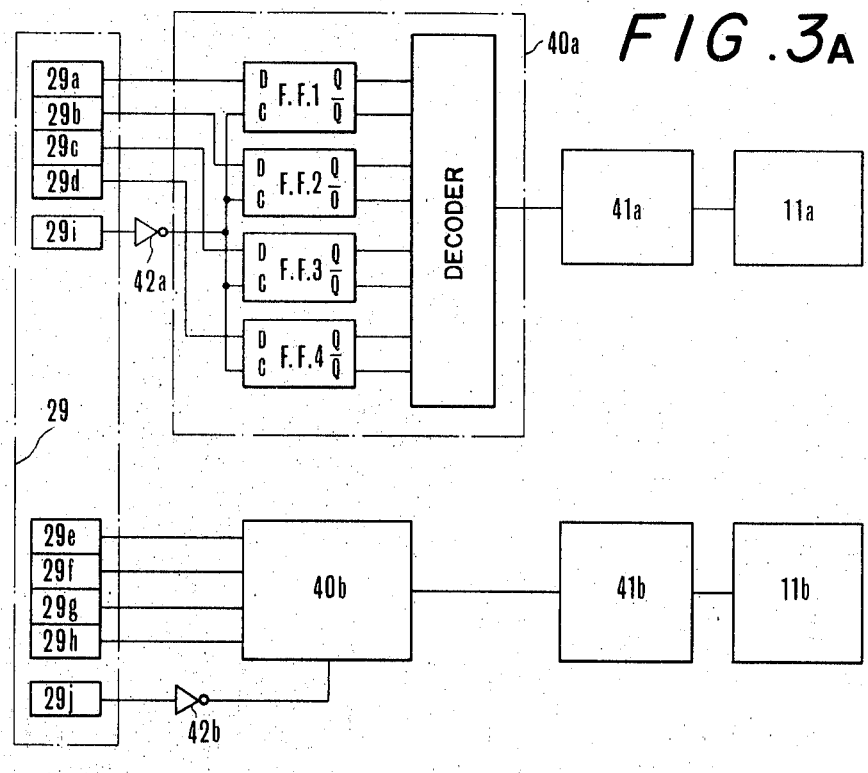
FIG. 3A shows a block diagram of the circuits for actuating the display tube used in this invention.

In FIG. 3A, there is illustrated a block diagram of the circuits provided in the weighing machine according to this invention. The photocells to read the information on the first order slits are designated as the numerals 29a, 29b, 29c, and 29d, while the photocells for the second order slits are referred to as the numerals 29e, 29f, 29g, and 29h. The reference numerals 29i and 29j are respectively representative of the photocells for the timing slits of the first order and of the second order. The outputs of the photocells 29a, 29b, 29c and 29d are coupled to a latch circuit 40a whose outputs are fed to a drive circuit 41a. A display tube 11a is actuated by the output signals from the drive circuit 41a. The latch circuit 40a is comprised of a plurality of flipflops and a decoder.

Figure 3B:
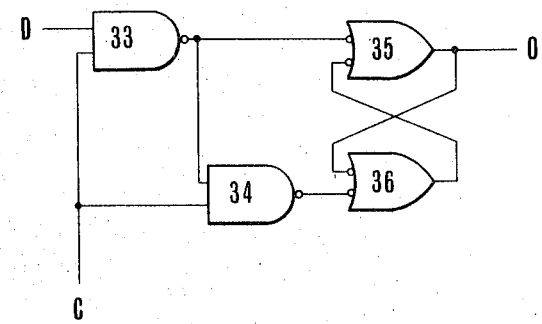
FIG. 3B shows a logic circuit of the latch circuit shown in FIG. 3A.

The flipflop used in the latch circuit 40a may be a flipflop having a control input, such as the flipflop of latch type shown in FIG. 3B. Numerals 33 and 34 are respectively NAND GATES while numerals 35 and 36 are NOR GATES connected as an ordinary flipflop. The input terminal D of the GATE 33 is connected to the photocells for the weight information. The input terminal C of the GATE 33 is connected to the photocells for timing pulses. As is well known, the NAND GATE is enabled only when two signals are concurrently applied on the input terminals thereof. NAND GATE 34 is used for supplying clear pulses to the flipflop 35, 36. Since this kind of flipflop is well known in the art, no further explanation will be made on the operation. The photocells 29a through 29d are connected to the corresponding terminals D of the flipflops. The photocell 29i is connected to all the terminals C of the flipflops through an inverter 42a. The decoder is connected to the terminals Q, Q' of the flipflops.

The photocells 29e to 29h for the second order slits are coupled to a latch circuit 40b which is connected to the photocell 29j via an inverter 42b. A driver circuit 41b is driven from the latch circuit 40b and delivers the output signal to a display tube 11b. The latch circuit 40b for the second order is arranged in the same way as the latch circuit 40a.

Figure 4:
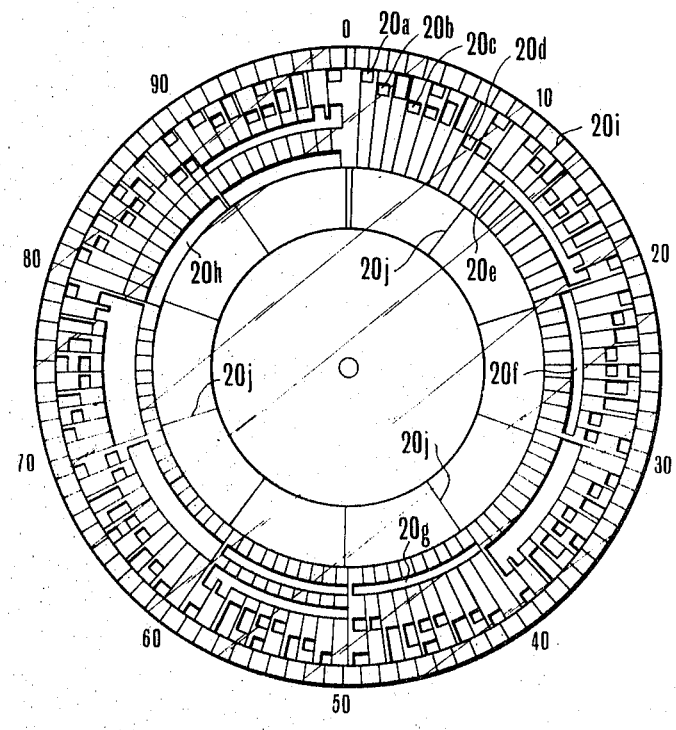
FIG. 4 is a preferred embodiment of a code disc according to this invention.

FIG. 4 shows a plan view of the code disc 20 illustrating the layout of the slits arranged thereon. Reference numerals 20a, 20b, 20c, and 20d respectively indicate a slit, and are representative of the first, the second, the third and the fourth bit in the first order, while numerals 20e, 20f, 20g, and 20h for the first, the second, the third and the fourth bit in the second order. Numerals 20i indicate the slits generating timing signals for the first order, while numerals 20j indicate the slits generating timing signals for the second order. The slit arrangement of each column in the radial direction generates digital signal representing the weight in cooperation with the photocells 29 and the light source 30. That is, the light source and the photocell are placed in opposed position with the code disc therebetween so that light from the light source passes through the slits and is sensed by the photocells connected to the electrical circuit. The slits 20i and 20j are respectively used for generating the timing signal in the first order and the second order. An extension of the border line dividing adjacent two columns in the radial direction passes through the substantial center of the slit 20i. As shown in FIG. 4, the chord length of each slit 20j extends over ten columns occupied by first order slits, and the border line of the two slits 20j is aligned with the substantial center line of the corresponding column. It should be noted that the code disc referred to above is a mere embodiment available to this invention, and other devices would be used in this invention. For example, a code disc with information magnetically recorded thereon, may be employed and a cooperating reading head for the information readout.

It should be understood that any desired order may be made available, if the desired number is employed in the group of slits, each group constituting one order in the number system. It will be noted that it is preferred to dispose the group of the lower order slits closer to the circumferential portion than the group of higher order slits and also the slits for timing signal for the first order are positioned nearer to the circumferential portion than the slits for the weight information.

In this embodiment of the disc, the slits are arranged in decimal digits in 8-4-2-1 binary code. However, any other code systems may be employed.

The operation on the embodiment according to this invention will now be described with reference to the accompanying drawings.

When a person mounts the platform 10b, the platform 10b descends. The descending motion of the platform causes the lever 23 partially to rotate in the clockwise direction. The crank lever 24 also is partially rotated by the movement of follower pin 22 which is coupled with the lever 23. The partial rotation of the crank lever 24 causes the rack 27 to move in linear motion. The code disc 20 is rotated through the pinion 28 which is coupled with the rack 27. That is, in this construction the descending motion of the platform is converted into rotational movement. The rotation of the code disc 20 is sequentially sensed by the photocells 29a–j. The photocells 29a–d sense light from the lamp 30 through the slits 20a–d and output electrical pulse signals to the latch circuit 40a.

As apparent from the above description, those slits are arranged to represent the amount of the weight in the binary form.

Thus, it can be seen that the construction shown in FIG. 2 functions to convert the descending motion into electrical signal in digital form. The photocell 29i is responsive to light through the timing slits 20i, and outputs the timing signal to the latch circuit 40a. The signals from the photocells 29a–d which includes the information of the weight in the binary code, is latched only when the latch circuit receives the timing signal from the photocell 29i. The digital information in binary form stored in the latched circuit 40a is applied to the decoder. The decoder information from the decoder is coupled to the driver circuit 41a which in turn actuates the display tube 11a.

From the above description, it may be seen that even if the undesired change of the signals from the photocells occurs due to the partial rotation back and forth of the disc, the figures displayed in the indicator are stabilized in indication because the signals from the photocells is not latched until the latch circuit receives the timing signal from the photocells.

The above description has concerned only the circuits for the first order. The circuits for the second order may operate similar to that for the first order. Accordingly, no explanation of the operation of the second order circuits will be made.

This invention may be provided with an effective switching circuit which closes the power supply circuit only when weighing operation is made. The switching circuit is illustrated by way of a schematic and block diagram in FIG. 5.

Figure 5:
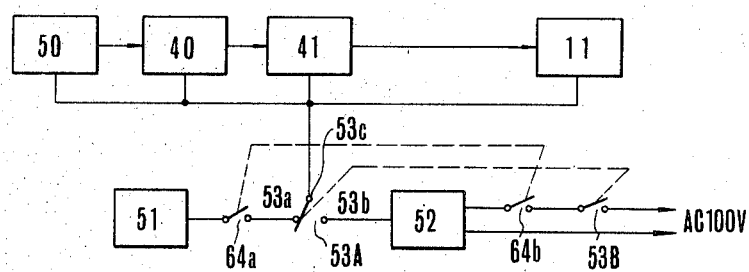
FIG. 5 is a schematic and block diagram of a switching circuit according to this invention.

In FIG. 5, a switch 64a and a switch 64b are inter-locked with each other for cooperative switching operation.

The switches 53A and 53B are also inter-locked to provide AC or DC operation. The traveling contact 53c of the switch 53 is connected to all the circuits of the weighing machine. The stationary contact 53a is connected to the stationary contact of the switch 64a while the stationary contact 53b is connected to the output of a rectifier 52. One of the input terminals of the rectifier 52 is connected to the traveling contact of the switch 64b. The stationary contact of the switch 64b is connected to the traveling contact of the switch 53B whose stationary contact is coupled to the A.C. source. Numeral 50 shows a converter including photocells 29 as shown in FIGS. 2 and 3.

Figure 6:
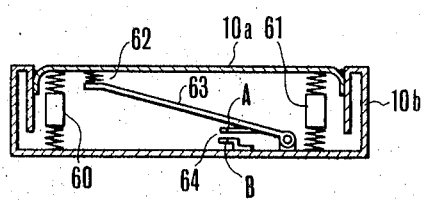
FIG. 6 is a cross sectional view showing the switches of FIG. 5 in relation to the mechanical construction of the weighing machine.

FIG. 6 shows the arrangement of switches 64a and 64b in relation to the mechanical construction of the weighing machine, only one switch designated as 64 being shown for the sake of convenience. The springs 60 and 61 support the platform 10a. The platform 10a is fitted in the case 10b and is slidable therealong. The lever 63 supports the platform 10a via the spring 62. The movable contact A of the switch 64 is fixed to the lever 63. When the platform descends, the lever partially turns counterclockwise while the movable contact A of the switch 64 moves into contact with the stationary contact B thereof.

Turning now to FIG. 5, the switches 53A and 53B are of a manual switch. In weighing operation, the platform 10a slides down along the inner wall of the case 10b thereby the switch 64 closes. At this time if the manual switch 53A is set as shown in FIG. 5, d.c. source power supply circuit 51 is connected and supplies the d.c. power to the electrical circuits 50, 40, 41 and 11 by way of the switches 64a, the stationary contact 53a and the traveling contact 53c. If the manual switch 53A is set in reverse, switch 53B is closed and an a.c. power supplying circuit is formed. The rectifier 52 rectifies a.c. power.

Thus, the weighing machine is improved in that the power supply is turned on only when the weighing operation is effected with the result that the power consumption is minimized and the components used in the circuits are made long-lived.

Having described a specific embodiment of our invention, it is believed obvious that modification and variations of this invention are possible in light of the above teachings.

What is claimed is:

1. A weighing machine with a digital display comprising: a disc means having a rotation in accordance with the descending movement of a weighing platform, said disc means having a first mark pattern generating digital signal corresponding to the amount of said disc rotation and a second mark pattern generating timing signals in relation to said first mark pattern, those marks being shifted in circumferential position relative to each other; memory means in which said digital signal is not stored therein until said memory means receives said timing signal; said disc means having at least a first group and a second group, each group comprising said first and second marks, said first group representing the first order while said second group representing the second order; and a display means to display figures representing the weight measured in response to the output from said memory means.

2. A weighing machine in accordance with claim 1, in which said memory circuit is comprised of a plurality of flip-flops, each of which is provided with a gate being enabled by coincidence of said digital and said timing signals.

3. A weighing machine as claimed in claim 1 in which said first mark is arranged in decimal digits in the 8-4-2-1 binary code.

4. A weighing machine as claimed in claim 1 in which said first group of marks is disposed nearer to the peripheral portion of said disc than the second group.

5. A weighing machine as claimed in claim 1 in which said second mark of said first group is disposed on the portion nearest to the circumference of said disc.

6. A weighing machine as claimed in claim 1 in which said first and second marks are slits respectively.

7. A weighing machine as claimed in claim 3, in which said flipflop is of a latch type.

8. A weighing machine with a digital display comprising: a disc means having a rotation in accordance with the descending movement of a weighing platform, said disc having plural digit annular areas encoded for respective digit orders of a multidigit number each annular area having at least one first mark generating digital signal corresponding to the amount of said disc rotation and at least one second mark generating timing signal in relation to said first mark, those marks being shifted in circumferential position relative to each other; memory means in which said digital signal is not stored therein until said memory means receives said timing signal; a display means to display figures representing the weight measured in response to the output from said memory means; and switching means automatically to close the power supply circuit therein when weighing operation is made.

9. A weighing machine with a digital display as claimed in claim 8, and including a manual switch connected in circuit with a d.c. power source and an a.c. power source selectively operable to energize the weighing and display circuits from either of said power sources.

* * * * *